(12) United States Patent
Chou (10) Patent No.: US 12,241,787 B2
(45) Date of Patent: Mar. 4, 2025

(54) MICROBOLOMETER AND METHOD OF MANUFACTURING THE SAME

(71) Applicant: HON HAI PRECISION INDUSTRY CO., LTD., New Taipei (TW)

(72) Inventor: Chun-Yuan Chou, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 225 days.

(21) Appl. No.: 17/655,366

(22) Filed: Mar. 18, 2022

(65) Prior Publication Data

US 2023/0251140 A1 Aug. 10, 2023

(30) Foreign Application Priority Data

Jan. 27, 2022 (TW) .................. 111103630

(51) Int. Cl.
*G01J 5/20* (2006.01)
*G01J 5/02* (2022.01)
*H04N 5/33* (2023.01)

(52) U.S. Cl.
CPC .............. *G01J 5/20* (2013.01); *G01J 5/024* (2013.01); *H04N 5/33* (2013.01); *G01J 2005/204* (2013.01)

(58) Field of Classification Search
CPC ............... H04N 5/33; G01J 2005/204
See application file for complete search history.

(56) References Cited

U.S. PATENT DOCUMENTS

| | | |
|---|---|---|
| 9,212,950 B2 | 12/2015 | Xu et al. |
| 10,184,839 B1 | 1/2019 | Brown et al. |
| 2014/0159032 A1 | 6/2014 | Syllaios et al. |
| 2015/0362374 A1* | 12/2015 | Wheeler ............ G01J 5/024 438/54 |
| 2019/0074392 A1 | 3/2019 | Kim et al. |

FOREIGN PATENT DOCUMENTS

| | | | |
|---|---|---|---|
| CN | 101881667 A | 11/2010 | |
| CN | 101886261 A | 11/2010 | |
| CN | 105393065 A | 3/2016 | |
| CN | 104535198 B | 7/2018 | |
| CN | 108807346 A * | 11/2018 | ......... C23C 14/0036 |
| CN | 109917498 A | 6/2019 | |
| CN | 110926604 A | 3/2020 | |

(Continued)

OTHER PUBLICATIONS

Ramana et al. On the growth mechanism of pulsed-laser deposited vanadium oxide thin films, Materials Science and Engineering B vol. 111, No. 2-3, pp. 218-225 (Year: 2004).*

(Continued)

*Primary Examiner* — Dani Fox
*Assistant Examiner* — Shun Lee
(74) *Attorney, Agent, or Firm* — CKC & Partners Co., LLC (57) ABSTRACT

The present disclosure provides a microbolometer including a substrate, a readout circuit layer disposed above the substrate, a first vanadium oxide layer disposed above the readout circuit layer, a second vanadium oxide layer disposed on the first vanadium oxide layer, and an infrared absorbing layer disposed above the second vanadium oxide layer, in which an oxygen content of the second vanadium oxide is higher than that of the first vanadium oxide layer.

17 Claims, 6 Drawing Sheets

(56) References Cited

FOREIGN PATENT DOCUMENTS

| CN | 112083470 A | 12/2020 |
|---|---|---|
| KR | 20150009772 A | 1/2015 |
| KR | 20200057607 A | 5/2020 |
| TW | 202107051 A | 2/2021 |
| TW | I725868 B | 4/2021 |
| WO | 2015195562 A1 | 12/2015 |

OTHER PUBLICATIONS

Miyazaki et al. Substrate bias effect on the fabrication of thermochromic VO2 films by reactive RF sputtering, Journal of Physics D: Applied Physics vol. 39, pp. 2220-2223 (Year: 2006).*

Fieldhouse et al. Electrical properties of vanadium oxide thin films for bolometer applications: processed by pulse dc sputtering, Journal of Physics D: Applied Physics vol. 42, 055408, 6 pages (Year: 2009).*

Santos et al. Controlled grain-size thermochromic VO2 coatings by the fast oxidation of sputtered vanadium or vanadium oxide films deposited at glancing angles, Surfaces and Interfaces vol. 27, 101581, 13 pages (Year: 2021).*

* cited by examiner

MICROBOLOMETER AND METHOD OF MANUFACTURING THE SAME

CROSS-REFERENCE TO RELATED APPLICATION

This application claims priority to Taiwan Application Serial Number 111103630, filed on Jan. 27, 2022, which is herein incorporated by reference in its entirety.

BACKGROUND

Field of Invention

The present disclosure relates to the microbolometer and methods of manufacturing the same. More particularly, the present disclosure relates to the microbolometer including the thermistor.

Description of Related Art

A microbolometer transforms the infrared radiation emitted by a sample into the electric signals, thereby being able to identify and display the temperature of the sample. For example, after the sample emits the infrared radiation, the thermistor in the microbolometer can absorb the infrared radiation and change its resistance. As a result, the current in the microbolometer varies, and the microbolometer then identifies the corresponding temperature of the sample by its circuit units. However, the thermistor can be easily affected during the manufacturing process so that it becomes difficult to maintain the infrared radiation sensitivity of the thermistor. Therefore, the method to increase the stability of the thermistor to maintain its infrared radiation sensitivity is important for improving the performance of the microbolometer.

SUMMARY

According to some embodiments of the present disclosure, a microbolometer includes a substrate, a readout circuit layer disposed above the substrate, a first vanadium oxide layer disposed above the readout circuit layer, a second vanadium oxide layer disposed on the first vanadium oxide layer, and an infrared absorbing layer disposed above the second vanadium oxide layer, in which an oxygen content of the second vanadium oxide layer is higher than that of the first vanadium oxide layer.

In some embodiments, the first vanadium oxide layer includes VO, $V_2O_3$, $VO_2$, $V_aO_{2a-1}$, $V_bO_{2b+1}$, or a combination thereof, in which a is an integer number between 4 and 9, b is 3, 4, or 6.

In some embodiments, the second vanadium oxide layer includes $V_2O_5$, $V_2O_c$, or a combination thereof, in which c is an integer number larger than 5.

In some embodiments, the oxygen content of the second vanadium oxide layer is between 70% and 90%.

In some embodiments, a thickness of the second vanadium oxide layer is between 1 nm and 10 nm.

In some embodiments, a thickness of the first vanadium oxide layer is between 50 nm and 250 nm.

In some embodiments, the oxygen content of the second vanadium oxide layer increases in a direction away from the first vanadium oxide layer.

In some embodiments, the second vanadium oxide layer includes amorphous vanadium oxide.

In some embodiments, an interface is formed between the second vanadium oxide layer and the first vanadium oxide layer, lattice forms on two sides of the interface are different.

In some embodiments, the microbolometer further includes a third vanadium oxide layer disposed on the second vanadium oxide layer, and an oxygen content of the third vanadium oxide layer is higher than that of the second vanadium oxide layer.

In some embodiments, a total thickness of the second vanadium oxide layer and the third vanadium oxide layer is between 1 nm and 10 nm.

In some embodiments, the microbolometer further includes a thermal insulation layer disposed between the readout circuit layer and the first vanadium oxide layer.

According to some embodiments of the present disclosure, a method of manufacturing a microbolometer includes the following operations. A first vanadium oxide layer is formed above a substrate, where the substrate is heated during forming the first vanadium oxide layer, a temperature of the substrate is between 300° C. and 400° C. A second vanadium oxide layer is formed on the first vanadium oxide layer, where an oxygen content of the second vanadium oxide layer is higher than that of the first vanadium oxide layer. An infrared absorbing layer is formed above the second vanadium oxide layer.

In some embodiments, forming the second vanadium oxide layer includes depositing the second vanadium oxide layer in an oxygen-rich environment, and an oxygen content of the oxygen-rich environment is higher than 50%.

In some embodiments, forming the second vanadium oxide layer includes oxidizing an upper portion of the first vanadium oxide layer into the second vanadium oxide layer.

In some embodiments, forming the first vanadium oxide layer includes bombarding a metal target with a radio frequency power or a pulse direct current power to produce a metal precursor and deposing the metal precursor above the substrate in an oxygen-containing environment.

In some embodiments, a duty cycle of the pulse direct current power is between 50% and 98%.

In some embodiments, an oxygen content of the oxygen-containing environment is between 10% and 50%.

In some embodiments, the substrate is applied with a bias voltage during forming the first vanadium oxide layer.

In some embodiments, the substrate is rotated at a rotation speed between 3 rpm and 25 rpm during forming the first vanadium oxide layer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, operations, arrangements, etc., are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, reference will now be made in detail to the present embodiments of the disclosure, examples of which are illustrated in the accompanying drawings. Wherever possible, the same reference numbers are used in the drawings and the description to refer to the same or like parts.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides a microbolometer and methods of manufacturing the same. The microbolometer includes a first vanadium oxide layer and a second vanadium oxide layer disposed on the first vanadium oxide layer, in which an oxygen content of the second vanadium oxide layer is higher than that of the first vanadium oxide layer. The second vanadium oxide layer protects the underlying first vanadium oxide layer from being affected by the environment so that the stability of the first vanadium oxide layer is increased. As such, the sensing performance of the microbolometer is improved.

Figure 1:
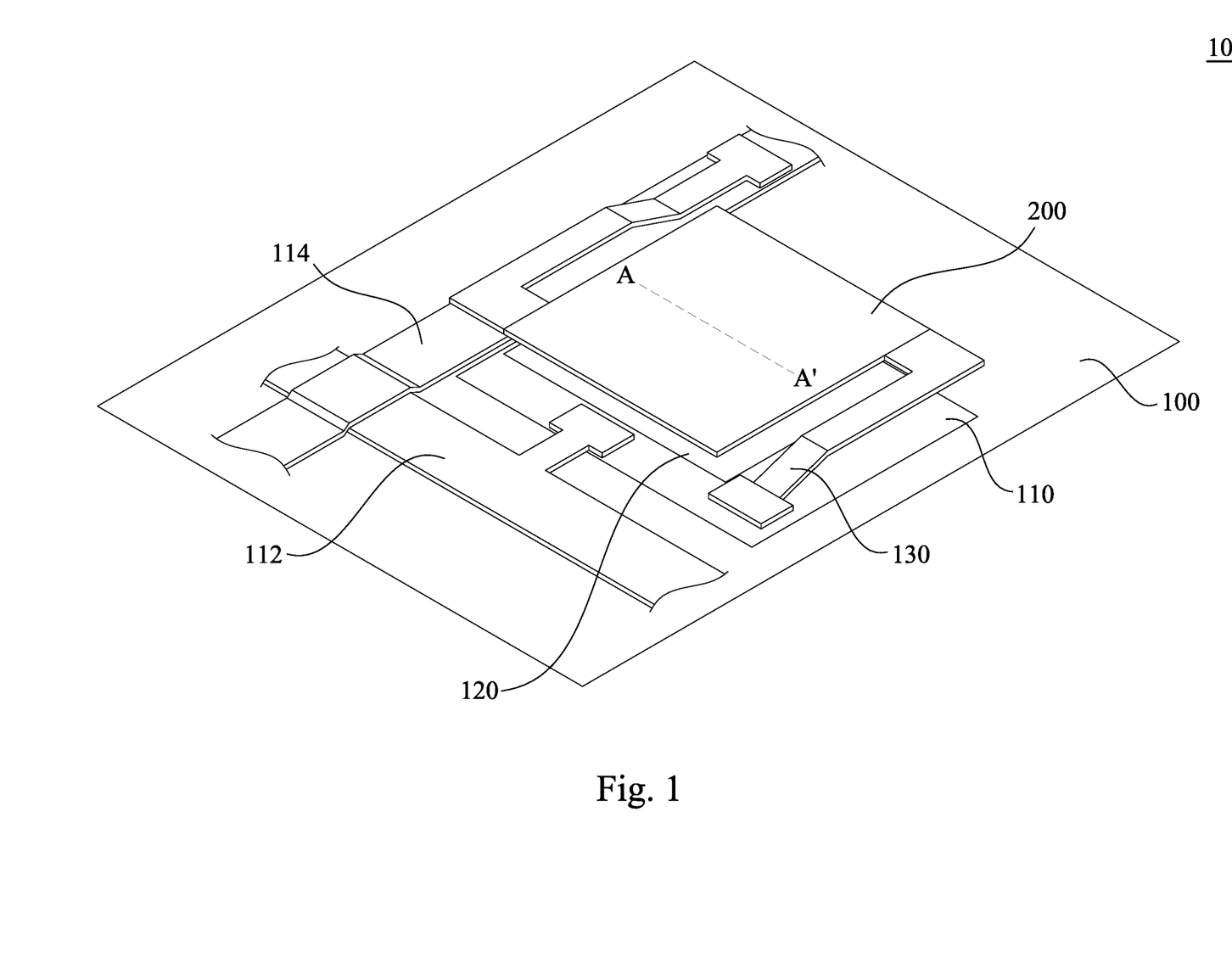
FIG. 1 illustrates a three dimensional schematic view of a microbolometer according to one embodiment of the present disclosure.
Figure 2:
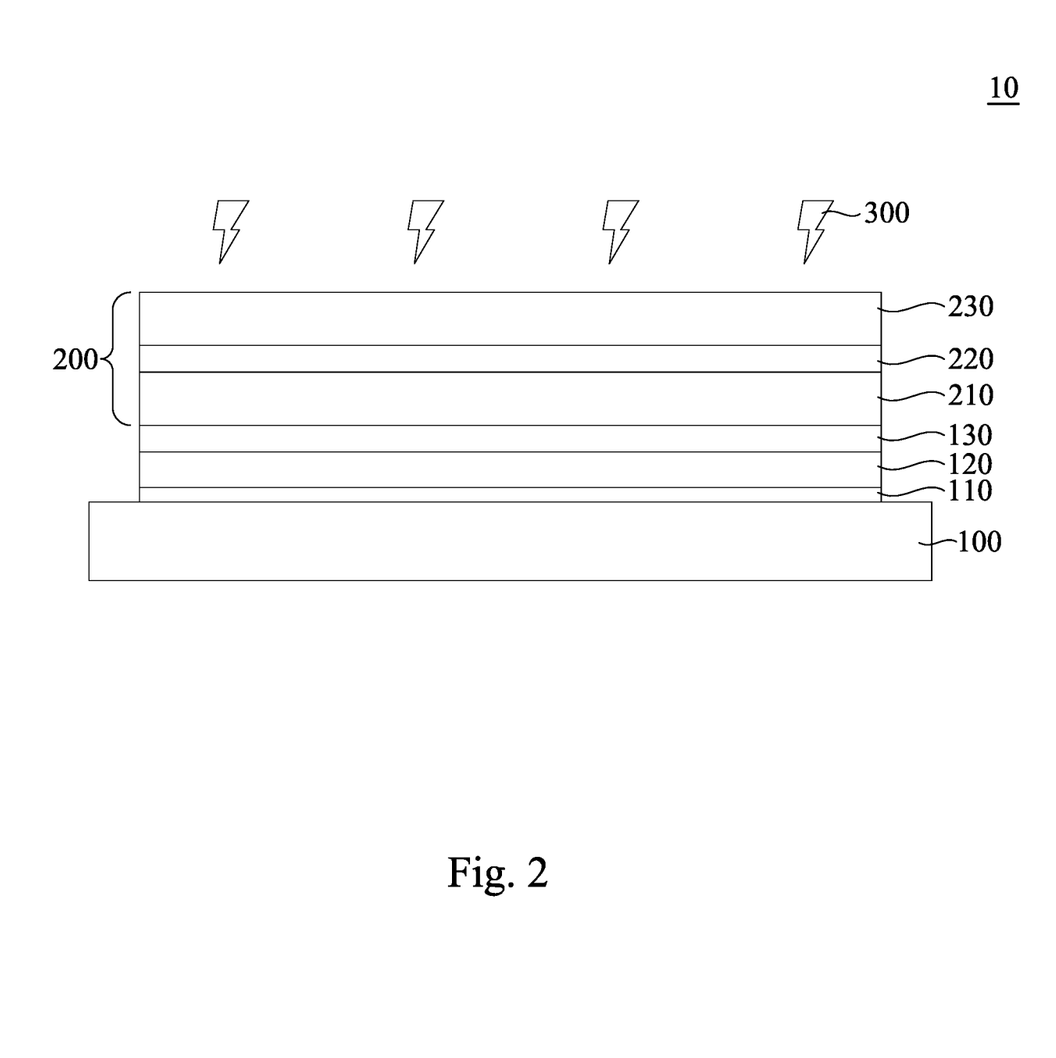
FIG. 2 illustrates a cross-sectional view of the microbolometer of FIG. 1 along the cut line A-A'.

According to some embodiments of the present disclosure, FIG. 1 illustrates a three dimensional schematic view of a microbolometer 10. FIG. 2 illustrates a cross-sectional view of the microbolometer 10 of FIG. 1 along the cut line A-A'. Referring to FIG. 1 and FIG. 2, the microbolometer 10 includes a substrate 100, a readout circuit layer 110 disposed above the substrate 100, and a sensing region 200 disposed above the readout circuit layer 110. After the external infrared radiation 300 is received by the sensing region 200, the sensing region 200 transforms the infrared radiation 300 into the electric signals which are transmitted to other circuit units (not shown) of the microbolometer 10 through the readout circuit layer 110.

Specifically, the sensing region 200 includes a first vanadium oxide layer 210, a second vanadium oxide layer 220 disposed on the first vanadium oxide layer 210, and an infrared absorbing layer 230 disposed above the second vanadium oxide layer 220. After the infrared radiation 300 is absorbed by the infrared absorbing layer 230, the energy is transferred to the underlying first vanadium oxide layer 210. The resistance of the first vanadium oxide layer 210 is changed after the first vanadium oxide layer 210 absorbs the energy. As a result, the current through the first vanadium oxide layer 210 varies and further produces the electric signals transmitted to the readout circuit layer 110. In some cases, the first vanadium oxide layer 210 may be referred as the thermistor. The second vanadium oxide layer 220 acting as a passivation layer covers the first vanadium oxide layer 210 so that the first vanadium oxide layer 210 is protected to maintain its composition and characteristic. More specifically, the oxygen content of the second vanadium oxide layer 220 is higher than that of the first vanadium oxide layer 210, such that the first vanadium oxide layer 210 would not be easily oxidized. The composition or characteristic, such as the temperature coefficient of resistance (TCR), of the first vanadium oxide layer 210 can then be maintained. In other words, the second vanadium oxide layer 220 can increase the stability of the first vanadium oxide layer 210, thereby improving the sensing performance of the microbolometer 10.

In some embodiments, the first vanadium oxide layer 210 may include an appropriate oxygen-to-metal ratio so that the first vanadium oxide layer 210 has the suitable resistance and temperature coefficient of resistance for being a thermistor. For example, the first vanadium oxide layer 210 may include $VO$, $V_2O_3$, $VO_2$, $V_aO_{2a-1}$, $V_bO_{2b+1}$, or a combination thereof, in which a is an integer number between 4 and 9, and b is 3, 4, or 6. In some embodiments, the oxygen content of the first vanadium oxide layer 210 may be between 50% and 70%, so that the first vanadium oxide layer 210 has suitable resistance and temperature coefficient of resistance. For example, the first vanadium oxide layer 210 may have uniform oxygen content, and the oxygen content may be about 65%. In some embodiments, the absolute value of the temperature coefficient of resistance of the first vanadium oxide layer 210 may be larger than 2% so that the first vanadium oxide layer 210 shows high sensitivity to the infrared radiation. For example, the absolute value of the temperature coefficient of resistance of the first vanadium oxide layer 210 may be between 2% and 4%. If the absolute value of the temperature coefficient of resistance of the first vanadium oxide layer 210 is smaller than 2%, the infrared radiation sensitivity of the first vanadium oxide layer 210 can be too low to precisely detect the external temperature change. In some embodiments, for example, the surface resistance of the first vanadium oxide layer 210 may be between one hundred thousand ohms per square (ohm/sq) and three million ohms per square. If the surface resistance of the first vanadium oxide layer 210 is smaller than one hundred thousand ohms per square, the surface resistance of the first vanadium oxide layer 210 can be too small so the noise may often happens. If the surface resistance of the first vanadium oxide layer 210 is larger than three million ohms per square, the signal-to-noise ratio (S/N ratio) of the first vanadium oxide layer 210 may be too low to precisely transmit the electric signals.

In some embodiments, the oxygen-to-metal ratio of the second vanadium oxide layer 220 may be high enough to protect the first vanadium oxide layer 210 from being oxidized. For example, the second vanadium oxide layer 220 may include $V_2O_5$, $V_2O_c$, or a combination thereof, in which c is an integer number lager than 5. In some embodiments, the oxygen content of the second vanadium oxide layer 220 may be no lower than 70% so that the second vanadium oxide layer 220 can prevent the external oxygen from entering the first vanadium oxide layer 210. For example, the oxygen content of the second vanadium oxide layer 220 may be between 70% and 90%. In some embodiments, the first vanadium oxide layer 210 and the second vanadium oxide layer 220 may include vanadium oxide with different lattice forms. Specifically, while the first vanadium oxide layer 210 and the second vanadium oxide layer 220 have different oxygen contents, the first vanadium oxide layer 210 and the second vanadium oxide layer 220 may show different lattice forms corresponding to their oxygen contents. For example, the second vanadium oxide layer 220 with higher oxygen content may include amorphous vanadium oxide, while the first vanadium oxide layer 210 with lower oxygen content may include crystalline vanadium oxide. In some embodiments which the first vanadium oxide layer 210 and the second vanadium oxide layer 220 include different lattice forms, an interface may be formed between the first vanadium oxide layer 210 and the second vanadium oxide layer 220. For example, when the first vanadium oxide layer 210 includes lattice form vanadium oxide and the second vanadium oxide layer 220 includes amorphous vanadium oxide, an interface with different lattice forms on its two sides may be formed between the first vanadium oxide layer 210 and the second vanadium oxide layer 220.

Figure 3A:
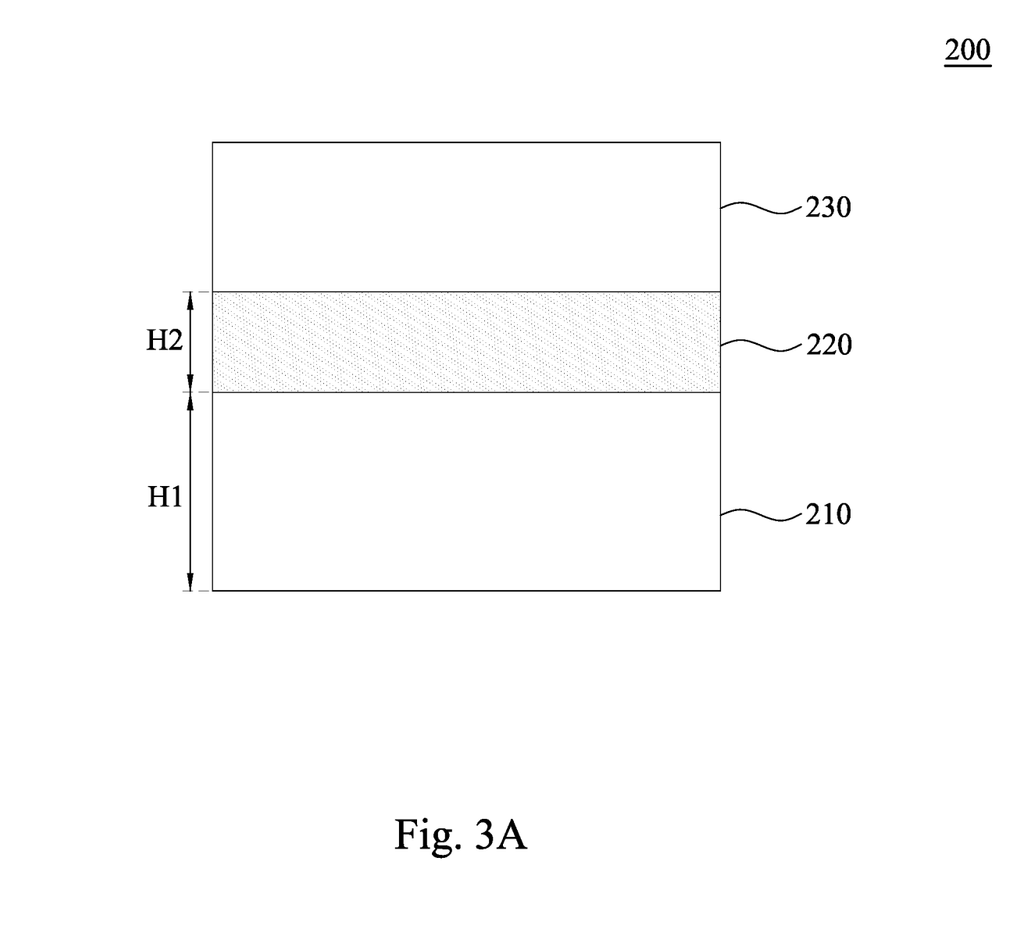
FIG. 3A illustrates a cross-sectional view of a sensing region of a microbolometer according to one embodiment of the present disclosure.
Figure 3B:
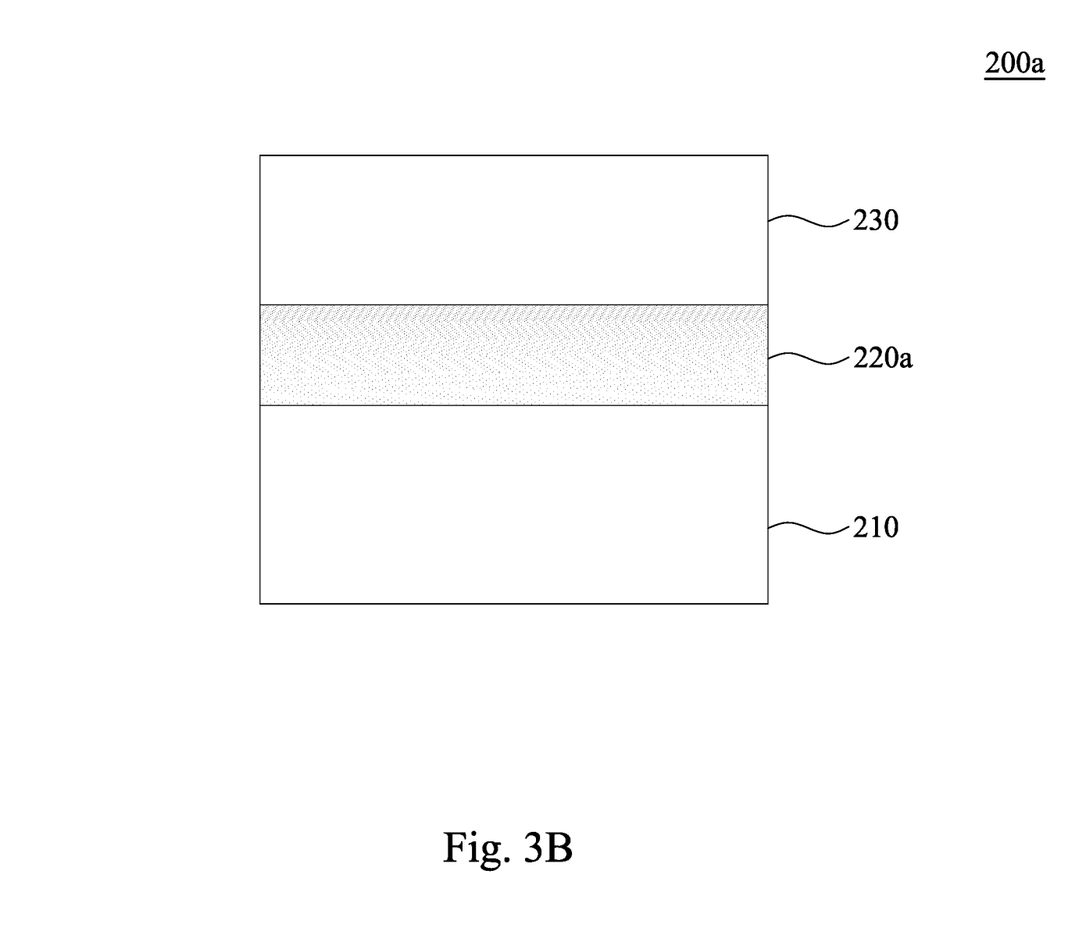
FIG. 3B illustrates a cross-sectional view of a sensing region of a microbolometer according to another embodiment of the present disclosure.
Figure 3C:
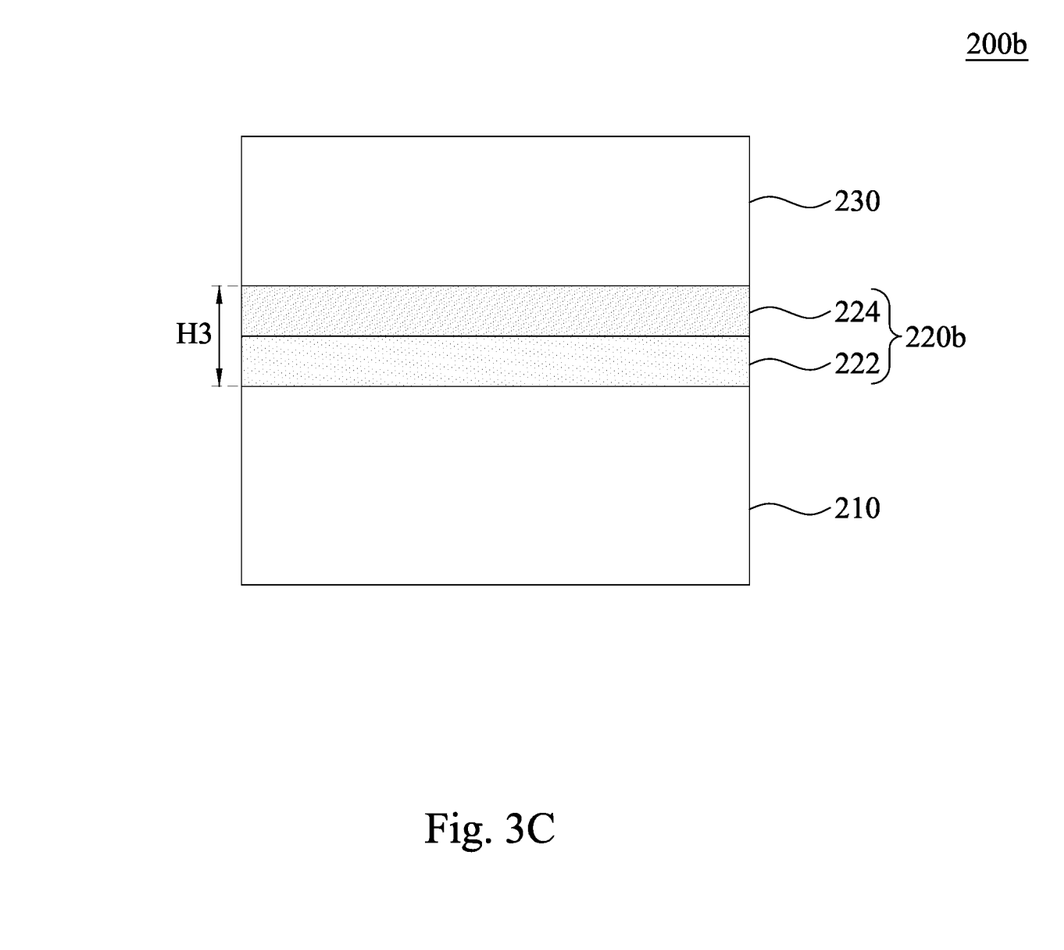
FIG. 3C illustrates a cross-sectional view of a sensing region of a microbolometer according to another embodiment of the present disclosure.

In some embodiments, the second vanadium oxide layer 220 may have different structures or compositions corresponding to the design of the microbolometer 10. According to some embodiments of the present disclosure, FIG. 3A to FIG. 3C illustrates cross-sectional views of a sensing region 200, a sensing region 200a, and a sensing region 200b of different microbolometers, respectively. Although FIG. 3A to FIG. 3C present the cross-sectional views of the sensing regions of the microbolometers for the purpose of clarity, the microbolometers of FIG. 3A to FIG. 3C may include other elements. In some embodiments, as shown in FIG. 3A, the second vanadium oxide layer 220 may be a single layer structure directly contacting the first vanadium oxide layer 210. The second vanadium oxide layer 220 has uniform component distribution so that the oxygen content of the upper portion of the second vanadium oxide layer 220 is equal to that of the lower portion of the second vanadium oxide layer 220. In some other embodiments, as shown in FIG. 3B, the oxygen distribution in the second vanadium oxide layer 220a may be non-uniform. For example, the second vanadium oxide layer 220a may have a gradient oxygen content, in which the oxygen content of the upper portion of the second vanadium oxide layer 220a is higher than that of the lower portion of the second vanadium oxide layer 220a. In other words, the oxygen content of the second vanadium oxide layer 220a may increase in a direction away from the first vanadium oxide layer 210. In some other embodiments, as shown in FIG. 3C, the second vanadium oxide layer 220b may be a multi-layer structure. For example, the second vanadium oxide layer 220b may include a second vanadium oxide lower layer 222 directly contacting the first vanadium oxide layer 210 and a second vanadium oxide upper layer 224 on the second vanadium oxide lower layer 222, in which the oxygen content of the second vanadium oxide upper layer 224 is higher than that of the second vanadium oxide lower layer 222. In other words, in the embodiments which the second vanadium oxide layer 220b is a multi-layer structure, the oxygen content of the upper portion of the second vanadium oxide layer 220b may be higher than that of the lower portion of the second vanadium oxide layer 220b.

In some embodiments, a thickness of the second vanadium oxide layer 220 may be smaller than that of the first vanadium oxide layer 210, thereby preventing the electrical performance of the first vanadium oxide layer 210 from being affected by the second vanadium oxide layer 220. For example, referring to FIG. 3A, the thickness H1 of the first vanadium oxide layer 210 may be between 50 nm and 250 nm, and the thickness H2 of the second vanadium oxide layer 220 may be between 1 nm and 10 nm. If the thickness H2 of the second vanadium oxide layer 220 is smaller than 1 nm, the second vanadium oxide layer 220 can be too thin to protect the underlying first vanadium oxide layer 210. If the thickness H2 of the second vanadium oxide layer 220 is larger than 10 nm, the resistance of the second vanadium oxide layer 220 can be too high, which affects the electrical performance of the first vanadium oxide layer 210. It should be noted that, in some embodiments which the second vanadium oxide layer is a multi-layer structure, a total thickness of the second vanadium oxide layer may be between 1 nm and 10 nm. For example, referring to FIG. 3C, the total thickness H3 of the second vanadium oxide lower layer 222 and the second vanadium oxide upper layer 224 may be between 1 nm and 10 nm. As a result, the total thickness H3 of the second vanadium oxide layer 220b is thick enough to protect the first vanadium oxide layer 210, while the second vanadium oxide layer 220b does not affect the electrical performance of the first vanadium oxide layer 210.

Referring back to FIG. 1 and FIG. 2, in some embodiments, the microbolometer 10 may further include an address line 112 connected to the readout circuit layer 110 and a signal line 114 connected to the sensing region 200 so that the electric signals produced by the readout circuit layer 110 can be transmitted to other elements, such as system chips, through the address line 112 and the signal line 114. In some embodiments, the microbolometer 10 may further include a supporting structure 130 below the sensing region 200 so that the first vanadium oxide layer 210 does not directly contact the readout circuit layer 110. For example, the supporting structure 130 may include a support platform and a pair of support legs, where the first vanadium oxide layer 210 is formed on the support platform and electrically connected to the readout circuit layer 110 by the support legs. In some embodiments, the support legs of the supporting structure 130 may have a bended shape, such that the support platform of the supporting structure 130 does not directly contact the readout circuit layer 110. In some embodiments, the microbolometer 10 may further include a thermal insulation layer 120 between the readout circuit layer 110 and the sensing region 200, which prevents the underlying readout circuit layer 110 from being affected by the temperature change of the first vanadium oxide layer 210 or the infrared absorbing layer 230.

Figure 4:
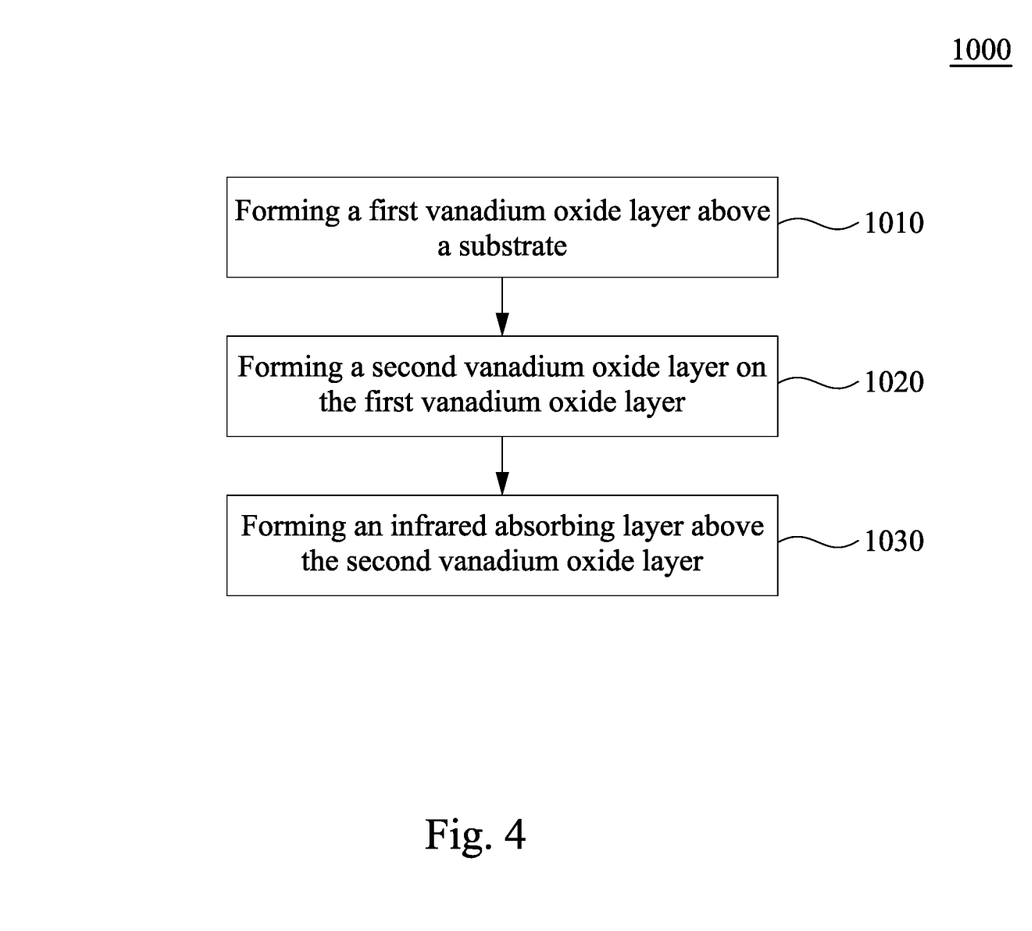
FIG. 4 illustrates a flow diagram of a method of manufacturing a microbolometer according to one embodiment of the present disclosure.

According to some embodiments of the present disclosure, FIG. 4 illustrates a flow diagram of the method 1000 of manufacturing the microbolometer. Specifically, the method 1000 can be used to manufacture the sensing region of the microbolometer, such as the sensing region 200 shown in FIG. 2. In addition, the first vanadium oxide layer with suitable temperature coefficient of resistance and the second vanadium oxide layer with high oxygen content can be formed by adjusting the process parameters of each operation in the method 1000. The method 1000 includes forming a first vanadium oxide layer above a substrate, forming a second vanadium oxide layer on the first vanadium oxide layer, and forming an infrared absorbing layer above the second vanadium oxide layer. In the following description, each above mentioned operation would be further discussed in details. It should be understood that additional operations may be added before, during, or after the method 1000, and the operations of the method may be substituted, cancelled, or logically rearranged in other embodiments.

In operation 1010, a first vanadium oxide layer is formed above a substrate. Specifically, the first vanadium oxide layer is deposited above the substrate, and the substrate is heated during the deposition of the first vanadium oxide layer so that the temperature of the substrate is between 300° C. and 400° C. Heating the substrate during the deposition process can increase the absolute value of the temperature coefficient of resistance of the first vanadium oxide layer, thereby improving the sensitivity of the first vanadium oxide layer. For example, compared to the un-heated substrate during the deposition process, forming the first vanadium oxide layer on the substrate heated to 360° C. can increase more than 10% of the absolute value of the temperature coefficient of resistance of the first vanadium oxide layer. In addition, heating the substrate during the first vanadium oxide layer deposition process can increase the deposition efficiency, thereby reducing the process duration and cost of the method 1000. Furthermore, the first vanadium oxide layer can form stable bonding therein on the heated substrate so that the first vanadium oxide layer has the expected crystalline structure, such as $VO_2$ with lattice form.

In some embodiments, the first vanadium oxide layer may be formed on the substrate by vapor deposition, such as physical vapor deposition (PVD), chemical vapor deposition (CVD), or the like. In some preferred embodiments, the first vanadium oxide layer may be formed by using physical vapor deposition, which prevents the first vanadium oxide layer from having impurities that affects the electrical performance of the first vanadium oxide layer. In some embodiments, forming the first vanadium oxide layer may include bombarding a metal target with a power source so that the metal atoms or ions are released from the metal target to produce the metal precursor. Then, the metal precursor is deposited above the substrate in an oxygen-containing environment to form the first vanadium oxide layer form the metal precursor. In some embodiments, the power source bombarding the metal target may be a radio frequency power with a power between 1000 W and 2500 W to provide the first vanadium oxide layer with suitable resistance. In some preferred embodiments, the power source bombarding the metal target may be a pulse direct current power with a power between 1000 W and 2500 W. As a result, the resistance value of the first vanadium oxide layer is decreased to the suitable range, and the absolute value of the temperature coefficient of resistance of the first vanadium oxide layer is increased. In some embodiments, the duty cycle of the pulse direct current power may be between 50% and 98% so that the first vanadium oxide layer is formed with a low enough resistance. In some embodiments, the oxygen-containing environment which the metal precursor is deposited therein may have the oxygen content between 10% and 50%. This can provide the first vanadium oxide layer with expected oxygen content and crystalline structure and increase the absolute value of the temperature coefficient of resistance of the first vanadium oxide layer. For example, the oxygen ratio in a mixture with argon of the oxygen-containing environment may be between 10% and 50%, and the air pressure of the oxygen-containing environment may be between 3 mtorr and 10 mtorr. Therefore, the formed first vanadium oxide layer includes $VO_2$ with lattice form and has the absolute value of the temperature coefficient of resistance higher than 2%.

In some embodiments, the substrate may be pre-cleaned before forming the first vanadium oxide layer, so that the first vanadium oxide layer is formed with a uniform thickness on the substrate with a flat surface. In some embodiments, the substrate may be applied with a bias voltage during the formation of the first vanadium oxide layer, which increases the consistency of the first vanadium oxide layer and reduces the stress in the first vanadium oxide layer. In some embodiments, the substrate may be rotated during the formation of the first vanadium oxide layer so that the first vanadium oxide layer is uniformly formed above the substrate. For example, the rotation speed of the substrate may be between 3 rpm and 25 rpm during depositing the first vanadium oxide layer.

In operation 1020, a second vanadium oxide layer is formed on the first vanadium oxide layer. Specifically, the second vanadium oxide layer is formed on the first vanadium oxide layer so that the second vanadium oxide layer covers the upper surface of the first vanadium oxide layer. After forming the second vanadium oxide layer, the second vanadium oxide layer with the oxygen content higher than that of the first vanadium oxide layer prevents the external oxygen from diffusing into the first vanadium oxide layer. Therefore, the second vanadium oxide layer protects the first vanadium oxide layer from being oxidized in the process, which improves the stability of the first vanadium oxide layer. More specifically, the second vanadium oxide layer and the first vanadium oxide layer may be formed in the same process chamber, or the substrate with the formed first vanadium oxide layer may be transferred through vacuum environment into the process chamber for forming the second vanadium oxide layer. As a result, the first vanadium oxide layer would not contact the external oxygen.

In some embodiments, the second vanadium oxide layer may be formed on the first vanadium oxide layer by vapor deposition, such as physical vapor deposition, chemical vapor deposition, or the like. In some embodiments, forming the second vanadium oxide layer may include depositing the second vanadium oxide layer in an oxygen-rich environment, where an oxygen content of the oxygen-rich environment is higher than 50%. As such, the oxygen content of the second vanadium oxide layer is higher than that of the first vanadium oxide layer. For example, the oxygen-rich environment may include oxygen and argon, in which the ratio of the oxygen may be between 50% and 70% so that the second vanadium oxide layer includes amorphous $V_2O_5$. In some embodiments, the second vanadium oxide layer may be formed as a multi-layer structure by repeating the same process operation with various oxygen contents of the oxygen-rich environment. Therefore, the oxygen content of the second vanadium oxide layer away from the first vanadium oxide layer is higher than that of the second vanadium oxide layer adjacent to the first vanadium oxide layer.

In some other embodiments, forming the second vanadium oxide layer may include oxidizing an upper portion of the first vanadium oxide layer into the second vanadium oxide layer, so that the second vanadium oxide layer with high oxygen content covers the first vanadium oxide layer. For example, after forming the first vanadium oxide layer, oxygen with high concentration, such as oxygen with its ratio higher than 50% in the process gas, may be introduced into the same process chamber heated to 300° C. to 500° C. inside. As a result, the upper portion of the first vanadium oxide layer is oxidized into the second vanadium oxide layer. In some other cases, the upper portion of the first vanadium oxide layer may be oxidized by using an oxygen plasma, thereby forming the second vanadium oxide layer having the high oxygen content. It should be noted that the oxidized upper portion of the first vanadium oxide layer may be thinner than the non-oxidized lower portion of the first vanadium oxide layer, so that the thickness of the second vanadium oxide layer is smaller than that of the remaining first vanadium oxide layer.

In operation 1030, an infrared absorbing layer is formed above the second vanadium oxide layer. Specifically, the infrared absorbing layer is formed above the second vanadium oxide layer so that the projection of the infrared absorbing layer on the first vanadium oxide layer covers the first vanadium oxide layer. Since the projection of the infrared absorbing layer covers the first vanadium oxide layer, the microbolometer may first absorb the external infrared radiation by the infrared absorbing layer. Then, the energy is transferred to the first vanadium oxide layer by the infrared absorbing layer, which increases the infrared radiation sensitivity of the microbolometer. In some embodiments, forming the infrared absorbing layer may include depositing the metal with high absorbance to infrared radiation, such as tungsten, chromium, nickel, compounds thereof, or the like. In some embodiments, forming the infrared absorbing layer may include depositing the infrared absorbing layer as a multi-layer structure so that the infrared absorbing layer has high absorbance. For example, the infrared absorbing layer may have a metal-dielectric-metal composite structure, in which the dielectric includes silicon nitride, silicon oxide, or the like.

According to the above-mentioned embodiments of the present disclosure, the microbolometer includes a first vanadium oxide layer and a second vanadium oxide layer on the first vanadium oxide layer. The first vanadium oxide layer and the second vanadium oxide layer have different composition so that the oxygen content of the second vanadium oxide layer is higher than the oxygen content of the first vanadium oxide layer. The second vanadium oxide layer protects the first vanadium oxide layer from being oxidized, thereby increasing the stability of the first vanadium oxide layer and improving the sensing performance of the microbolometer. In addition, the manufacturing method the microbolometer of the present disclosure includes heating the substrate during the formation of the first vanadium oxide layer and adjusting the process parameter of each operation. Therefore, the absolute value of the temperature coefficient of resistance of the first vanadium oxide layer is increased, which improves the infrared radiation sensitivity of the microbolometer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A microbolometer, comprising:
   a substrate;
   a readout circuit layer disposed above the substrate;
   a first vanadium oxide layer disposed above the readout circuit layer;
   a second vanadium oxide layer disposed on the first vanadium oxide layer and covers an entire top surface of the first vanadium oxide layer to form an interface with the first vanadium oxide layer, wherein the first vanadium oxide layer is a crystalline vanadium oxide layer, and the second vanadium oxide layer is an amorphous vanadium oxide layer such that lattice forms on two sides of the interface are different,
   wherein an oxygen content of the second vanadium oxide layer is higher than an oxygen content of the first vanadium oxide layer, a thickness of the second vanadium oxide layer is thinner than a thickness of the first vanadium oxide layer; and
   an infrared absorbing layer disposed above the second vanadium oxide layer and covers an entire top surface of the second vanadium oxide layer.

2. The microbolometer of claim 1, wherein the first vanadium oxide layer comprises VO, $V_2O_3$, $VO_2$, $V_2O_{2a-1}$, $V_bO_{2b+1}$, or a combination thereof, wherein a is an integer number between 4 and 9, and b is 3, 4, or 6.

3. The microbolometer of claim 1, wherein the second vanadium oxide layer comprises $V_2O_5$, $V_2O_c$, or a combination thereof, wherein c is an integer number larger than 5.

4. The microbolometer of claim 1, wherein the oxygen content of the second vanadium oxide layer is between 70% and 90%.

5. The microbolometer of claim 1, wherein the thickness of the second vanadium oxide layer is between 1 nm and 10 nm.

6. The microbolometer of claim 1, wherein the thickness of the first vanadium oxide layer is between 50 nm and 250 nm.

7. The microbolometer of claim 1, wherein the oxygen content of the second vanadium oxide layer increases in a direction away from the first vanadium oxide layer.

8. The microbolometer of claim 1, further comprising a third vanadium oxide layer disposed on the second vanadium oxide layer, and an oxygen content of the third vanadium oxide layer is higher than the oxygen content of the second vanadium oxide layer.

9. The microbolometer of claim 8, wherein a total thickness of the second vanadium oxide layer and the third vanadium oxide layer is between 1 nm and 10 nm.

10. The microbolometer of claim 1, further comprising a thermal insulation layer disposed between the readout circuit layer and the first vanadium oxide layer.

11. A method of manufacturing a microbolometer, comprising:
   forming a first vanadium oxide layer above a substrate, wherein the substrate is heated during forming the first vanadium oxide layer, and a temperature of the substrate is between 300° C. and 400° C.;
   forming a second vanadium oxide layer on the first vanadium oxide layer to cover an entire top surface of the first vanadium oxide layer, wherein an oxygen content of the second vanadium oxide layer is higher than an oxygen content of the first vanadium oxide layer, a thickness of the second vanadium oxide layer is thinner than a thickness of the first vanadium oxide layer,
   wherein an interface is formed between the first vanadium oxide layer and the second vanadium oxide layer, the first vanadium oxide layer is a crystalline vanadium oxide layer, and the second vanadium oxide layer is an amorphous vanadium oxide layer such that lattice forms on two sides of the interface are different; and
   forming an infrared absorbing layer above the second vanadium oxide layer to cover an entire top surface of the second vanadium oxide layer.

12. The method of claim 11, wherein forming the second vanadium oxide layer comprises depositing the second vanadium oxide layer in an oxygen-rich environment, and an oxygen content of the oxygen-rich environment is higher than 50%.

13. The method of claim 11, wherein forming the second vanadium oxide layer comprises oxidizing an upper portion of the first vanadium oxide layer into the second vanadium oxide layer.

14. The method of claim 11, wherein forming the first vanadium oxide layer comprising:
bombarding a metal target with a radio frequency power or a pulse direct current power to produce a metal precursor; and
depositing the metal precursor above the substrate in an oxygen-containing environment.

15. The method of claim 14, wherein a duty cycle of the pulse direct current power is between 50% and 98%.

16. The method of claim 14, wherein an oxygen content of the oxygen-containing environment is between 10% and 50%.

17. The method of claim 11, wherein the substrate is rotated at a rotation speed between 3 rpm and 25 rpm during forming the first vanadium oxide layer.

* * * * *